United States Patent

Peterscheck et al.

[11] Patent Number: 5,368,750
[45] Date of Patent: Nov. 29, 1994

[54] METHOD FOR CO-PROCESSING ORGANIC WASTES AND SPENT NITRIC ACID WASH WATER

[75] Inventors: Hermann W. Peterscheck, Odijk, Netherlands; William L. K. Schwoyer, Boulder; Dean Sillerud, Longmont, both of Colo.

[73] Assignee: Waste Treatment Patents en Research N.V., Curacao, Netherlands

[21] Appl. No.: 57,412

[22] Filed: May 6, 1993

[30] Foreign Application Priority Data

May 6, 1992 [EP] European Pat. Off. ......... 92201278.6

[51] Int. Cl.$^5$ .............................................. C02F 1/74
[52] U.S. Cl. .................................................... 210/761
[58] Field of Search .......................................... 210/761

[56] References Cited

U.S. PATENT DOCUMENTS 4,272,383  6/1981  McGrew .

FOREIGN PATENT DOCUMENTS 0362978  4/1990  European Pat. Off. .
2220385  11/1992  Germany .
2265695  10/1990  Japan .

OTHER PUBLICATIONS

J. J. Van Den Berg, "Treatment of Sewage-Sludge", Aug. 27, 1987, pp. 442–448, Rijswijk, Netherlands.

*Primary Examiner*—Neil McCarthy
*Attorney, Agent, or Firm*—Young & Thompson

[57] ABSTRACT

A process is disclosed for co-processing spent nitric acid wash water with organic or biological wastes under wet oxidation conditions whereby the nitrogen content of the waste and the chemical oxygen demand and the nitrogen content of the nitric acid wash water and of the organic or biological wastes are significantly reduced. The nitric acid wash water is the waste stream generated by descaling wet oxidation reactors used for the treatment of organic or biological wastes, especially municipal wastes. The process of this invention can be carried out in conventional above ground equipment or in a subterranean, down-hole reactor having a vertical configuration which utilizes gravitational forces to provide a high pressure reaction environment. The nitric acid wash water and organic wastes are reacted with an oxidant at a temperature greater than 150° C. and a pressure suffient to keep water in the liquid state. The nitric acid wash water is mixed with the organic waste or is introduced through the oxidant (preferably gaseous oxygen) inlet in such a manner that gas with water vapor and the remaining acid provides a liquid film so there are essentially no "dry spots" in the oxidant inlet lines.

11 Claims, 3 Drawing Sheets

5,368,750

METHOD FOR CO-PROCESSING ORGANIC WASTES AND SPENT NITRIC ACID WASH WATER

FIELD OF INVENTION

The present invention generally relates to a method for treating organic wastes and waste water in a wet oxidation reactor system with or without residue from scale material which form on the reactor surfaces and which must be periodically removed from the reactor surfaces. More specifically, the present invention relates to a process by which a nitrogen containing waste or a mixture of nitrogen containing waste and wash water stream generated from descaling of a wet oxidation reactor system by nitric acid treatment can be treated in an efficient and economic manner in the wet oxidation reactor system.

BACKGROUND OF INVENTION

The treatment of organic wastes such as municipal sludge and industrial wastes has become of increasing importance in our society. One method for treating such organic waste is a wet oxidation reaction system using conventional above ground equipment or a subterranean or "down-hole" reactor.

The first known successful subterranean wet oxidation reaction apparatus was constructed and operated by the assignee of the present application according to the principles set forth in McGrew, U.S. Pat. No. 4,272,383, which is hereby incorporated by reference. This down-hole reaction apparatus has a vertical configuration which utilizes gravitational forces in thermodynamic relationships to provide a high pressure reaction environment at optimal mass transfer.

This down-hole reaction apparatus is particularly useful in breaking down organic matter present in the large volume municipal waste market through an aqueous phase combustion process which is generally referred to as "wet oxidation." As will be known to those skilled in the art, wet oxidation of combustible organic matter is an exothermic reaction which proceeds rapidly at temperatures above 200° C. The reduction of the chemical oxygen demand (COD) of the waste is a primary goal of the municipal waste destruction process. By reducing the waste COD, eutrophication of the receiving waters is prevented or, at least, minimized. In addition, the wet oxidation process degrades potentially toxic hydrocarbons which could otherwise pollute receiving waters. Thus, wet oxidation is a proven method for the destruction of municipal organic wastes and industrial organic wastes.

Generally, a down-hole reactor apparatus comprises a vertically oriented, subsurface chamber defined by the casing of the subterranean shaft. The subterranean shaft normally extends about 500 to 3000 meters and preferably about 1200 meters into the earth. Suspended in the chamber and spaced apart from the casing is a tubular reaction vessel. The tubular reaction vessel has a closed end waste containment tube in which a waste pipe is centrally disposed. The containment tube and the waste pipe are arranged concentrically to form an external passage or annulus defined by the inner wall of the containment tube and the outer wall of the waste pipe. The bore of the waste pipe and the external passage are in full communication at the lower end of the reaction vessel. Also suspended in the chamber is a conduit which is substantially parallel to, but spaced apart from, the reaction vessel. Through this conduit, a heat transfer medium is preferably pumped into the chamber. Thus, an external heat exchanger is provided.

In order to rapidly oxidize the quantities of organic matter found in municipal or industrial wastes, it is necessary to supply an oxidant. Hence, during operation of a wet oxidation system municipal or industrial wastes which contain organic matter are pumped or injected into the down going reaction passage along with an oxidant. The oxidant can be air, oxygen-enriched air, or essentially pure gaseous oxygen. Generally, oxygen-enriched air or pure gaseous oxygen are preferred. Liquid oxygen can be supplied on site for conversion into the gaseous state for injection as needed. The flow rates of the diluted municipal or industrial wastes and the gaseous oxidant or oxidants through the reaction apparatus are regulated to provide a sufficient flow velocity such that intense mixing occurs. Such mixing enhances the mass transfer between the oxygen and the combustible components of the municipal or industrial waste. The gaseous oxygen may be injected into a diluted municipal or industrial waste through one or more gas supply lines which are suspended in the down going and/or upcoming reactant passage.

As the concentration of available oxygen and the temperature of the reactants increase, the rate of the wet oxidation reaction also increases. The exothermic oxidation reaction generates substantial heat which, in turn, further elevates the temperature of the reactants. Given the supply of oxidizable material is not limiting, and the temperature of the reactants reaches about 180° to 210° C., the reaction becomes autogenic. The hydrostatic head of the column of the diluted waste prevents the aqueous reaction mixture in the reaction zone from boiling. Typically, the column or diluted waste and the gaseous oxygen are mixed throughout the entire length of the reaction apparatus, which can exceed a kilometer in length. The temperature of the reaction mixture is allowed to increase to about 260° to 370° C. within the reaction zone (the lower part of the down-going reactant passage). The diluted municipal or industrial waste is thereby oxidized in the wet oxidation reaction. The reaction products or a solid containing effluent of this oxidation process include a low volume, sterile solid residue material, a liquid effluent, and off gases.

As will be apparent to one skilled in the art, one key to the commercial success of such vertical tube reaction systems is the energy efficiency possible as a result of employing the natural principals of gravity and thermodynamics to create the heat and pressure necessary to maintain the reaction. To insure the necessary efficiencies of the system, it is important that the walls of the tube remain substantially free of inorganic scale and that other accumulations or plugging within the reactor tubes are minimized. Scale build-up on the walls of the vertical tubes reduces the efficiency of the heat exchange process between the influent and the effluent waste streams through the walls of the tubes separating the two flows, thereby reducing both the energy recovery and control over the reaction process. Scale build-up on the walls of the tubes also increases wall friction and reduces the available cross-sectional area through which the fluid waste streams may flow, thereby increasing the load on the pump or pumps injecting and/or circulating the fluid waste and oxidant streams.

The scale found in a wet oxidation treatment apparatus consists, in a large part, of hard anhydrite scale which is comprised of calcium sulfate (CaSO4) Al-phosphates (apatite). The environment of a wet oxidation process will include pyrolysis, hydrolysis, and oxidation reactions. In such an environment, the retrograde solubility of calcium sulfate will result in the precipitation of calcium sulfate and the formation of anhydrite scale on the hot tube surfaces. Scale deposition will be especially heavy on the tube surfaces found in the hottest portion of the reactor system (i.e., the reaction zone). With calcium sulfate and other substances which exhibit such retrograde solubility, as the solution temperature increases, the solubility decreases. Thus, in the reaction zone, which is at a temperature of approximately 260° to 370° C. essential quantities of calcium sulfate present will precipitate out of the solution, thereby forming scale.

Periodic removal of such scale is necessary in order to minimize degradation of fluid flow and heat transfer characteristics of the reactor. Scale removal is usually accomplished by taking the reactor out of service and circulating a cleaning chemical or chemicals through the reactor. These cleaning chemicals or solutions act as solvents to dissolve and suspend as a slurry the scale to the point where it can be readily removed or detached from the metal surfaces and flushed from the reactor system. The descaling chemicals normally used are ones which will readily remove calcium and aluminum compounds and especially calcium sulfate. Such descaling chemicals include nitric acid, ethylene diamine tetraacetic acid, and Rochelle salts. Nitric acid is the most commonly used solvent for removing scale in a wet oxidation reactor. In such a descaling process, nitric acid tends to act as a solvent rather than as an acid/base reactant. Therefore, the nitric acid is not neutralized during the descaling procedure. The prevailing practice is to neutralize the nitric acid contained in a used or spent descaling solution prior to disposal by reacting it with a base such as an oxide, hydroxide, or carbonate of sodium, calcium, or ammonia. The resulting neutralized effluent may still contain significant amounts of nitrogen-containing compounds.

The disposal of such effluents creates considerable problems due to the nitrogen-containing materials therein. Normally such materials cannot be discharged to surface or ground water or to publicly owned treatment works (POTWs) because of nitrogen limits placed on such waters and discharges flowing to them. It is desired, therefore, to provide a method by which the nitrogen content of such resulting descaling solutions could be reduced. The present invention provides a method by which the nitrogen content of the resulting descaling effluent can be significantly reduced to more environmentally compatible levels and also shows that nitrogen present in the waste is reduced by the aqueous phase oxidation.

SUMMARY OF THE INVENTION

In accordance with the present invention, a method is provided by which:
a) Nitrogen containing wastes are reduced in nitrogen content through APO and
b) nitric acid descaling solutions mixed to nitrogen containing waste streams can be treated to effectively and significantly reduce the nitrogen content and the COD values of such solutions either with or without the solid scale portion under APO (Aqueous Phase Oxidation) conditions.

This method involves:

a) Treatment of nitrogen containing wastes under APO conditions.
b) Mixing nitric acid descaling or wash water with organic wastes, such as municipal or industrial wastes, and then reacting that mixture with an oxidant at high temperatures and pressures in a wet oxidation, reactor. The reactor can be a down hole vessel.

The method of this invention provides a relatively simple and inexpensive method to treat and dispose of the nitric acid wash water obtained from the descaling of down-hole reaction equipment used to treat organic waste, especially municipal and industrial organic waste, by the wet oxidation reaction. Moreover, the process of this invention surprisingly provides a method by which these organic wastes can be treated more effectively. Co-processing the nitric acid descaling solution with organic wastes results in a significant decrease in both the TKN nitrogen content and the COD values of the reaction products over that expected in the absence of the nitric acid descaling solution. The process of this invention can readily be incorporated into existing wet oxidation systems currently in use for treating organic wastes. Generally, only minimal and relatively simple modifications of existing wet oxidation processes for treatment of organic wastes are required to practice the present invention. Therefore, the benefits of the present invention can be obtained with only modest capital expenditures.

One object of the present invention is to provide a method for co-processing organic wastes and nitric acid wash water in a wet oxidation reaction apparatus, whereby the chemical oxygen demand and the nitrogen content of the organic waste and the nitric acid wash water are substantially reduced, the method comprising the steps of:

(a) mixing the organic wastes and nitric acid wash water to form a combined waste stream;
(b) injecting an oxidant into the combined waste stream;
(c) reacting the combined waste stream and oxidant in a wet oxidation reaction apparatus at a temperature greater than 150° C. and a pressure sufficient to keep the water in the liquid state for a time sufficient to form reaction products with substantially reduced chemical oxygen demand and nitrogen content relative to the original organic waste and nitric acid wash water; and
(d) collecting the reaction products;
wherein the nitric acid wash water is derived from descaling of a wet oxidation reaction system used for the treatment of organic wastes by circulation of an aqueous nitric acid solution through the wet oxidation reaction system to dissolve accumulated scale therein.

The expression "a pressure sufficient to keep the water in the liquid state . . . " means that the pressure lies above the vapour pressure of water at the corresponding temperature. "A time sufficient to form reaction products with . . . " refers to a residence time which is a function of the temperature. If the residence time is increased, the temperature may be decreased. In general, the residence time is in the range of 5 sec. up to 2 hours.

Another object of the present invention is to provide a method for co-processing organic wastes and nitric acid wash water in a wet oxidation, down-hole reaction apparatus, whereby the chemical oxygen demand and the nitrogen content of the organic waste and the nitric acid wash water are substantially reduced, the method comprising the steps of:
(a) flowing the organic waste downwardly into the down-hole reaction apparatus as a stream of influent waste;
(b) injecting the nitric acid wash water into a gaseous oxidant stream to form a combined oxidant and nitric acid wash water stream;
(c) injecting the combined oxidant and nitric acid wash water stream into the stream of influent waste flowing downwardly in the down-hole reaction apparatus;
(d) reacting the stream of influent waste with the combined oxidant and nitric acid wash water stream by the wet oxidation reaction in the down-hole reaction apparatus at a temperature greater than 150° C. and a pressure sufficient to keep the water present in the liquid state to form reaction products with significantly reduced chemical oxidation demand and nitrogen content relative to the original organic waste and nitric acid wash water; and
(e) collecting the reaction products;
wherein the nitric acid wash water is derived from descaling of the down-hole reaction apparatus by circulation of an aqueous nitric acid solution through the down-hole reaction apparatus to dissolve accumulated scale therein.

These and other objects and advantages of this invention will be more fully understood from the drawings, detailed description of the invention, the examples, and the appended claims which follow.

DESCRIPTION OF THE PREFERRED EMBODIMENTS

This invention generally relates to a method of treating the nitric acid wash water solutions derived from descaling of wet oxidation reaction systems used for the treatment of organic wastes whereby the chemical oxygen demand (COD) and the nitrogen content of the nitric acid wash water can be significantly reduced. In addition to providing a method for treatment of such nitric acid wash water solutions, the present invention also provides an improved method for treatment of organic wastes in a wet oxidation reaction system since the COD and the nitrogen content of the waste is reduced by the waste nitrate stream. The method of the present invention is especially useful for the co-processing or co-treatment of organic wastes and nitric acid descaling wash water solutions in a wet oxidation, down-hole reaction system.

Figure 1:
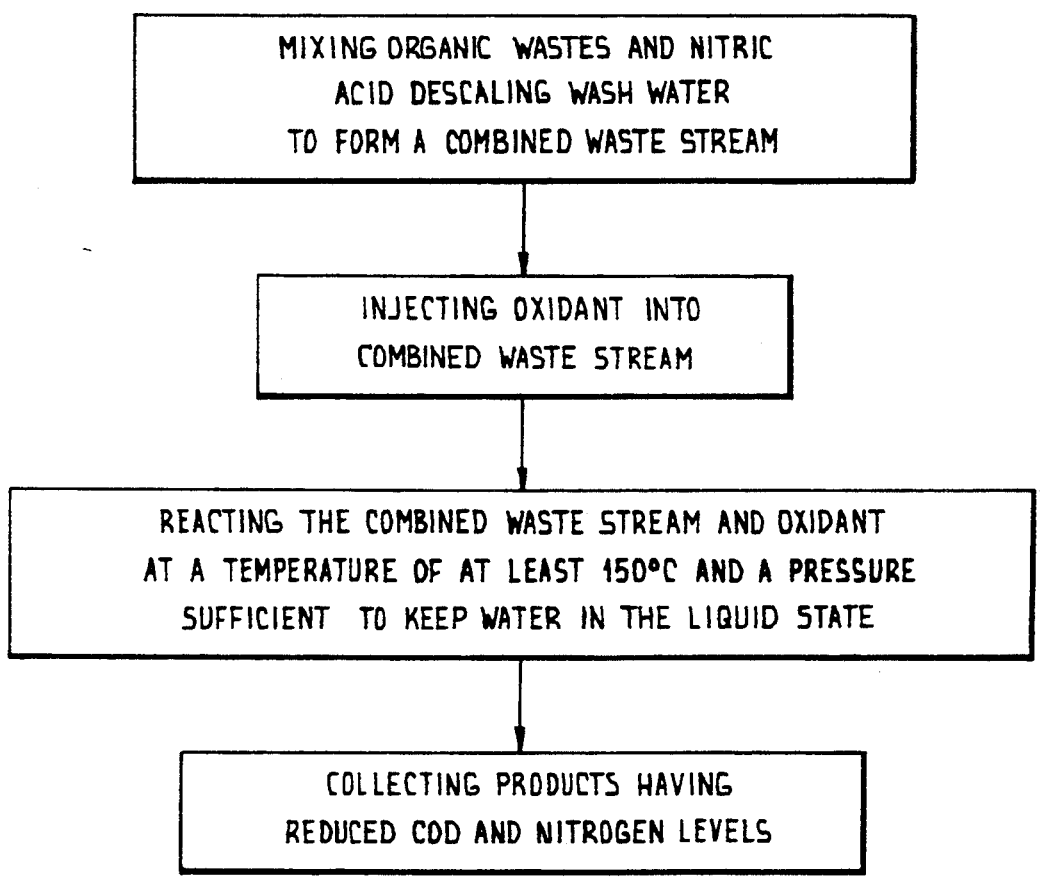
FIG. 1 is a flowchart illustrating the general method of the present invention for co-processing organic wastes and nitric acid descaling wash water in a wet oxidation reaction system.

As illustrated in FIG. 1, the present invention generally involves mixing organic wastes and nitric acid descaling wash water to form a single, combined waste stream and then injecting an oxidant into the combined waste stream. The reactants (i.e. the combined waste stream and the oxidant) are then reacted in a suitable reactor at a temperature of at least 150° C. and a pressure sufficient to keep the water in the reactant in the liquid state (i.e. wet oxidation conditions). The temperature and pressure are maintained for a sufficient time so that the reaction products formed have a significantly reduced COD and nitrogen levels relative to the original combined waste stream. The resulting reaction products having significantly reduced COD and nitrogen levels are then collected. The collected reaction products can be disposed of by acceptable means as desired.

Although this present invention can be carried out in any suitable reaction apparatus, it is described here that a subterranean vertical tube or down-hole reactor system is employed. Such down-hole reaction systems are used to treat or process waste streams from municipal sludge, pulp and paper manufacturing, industrial and petrochemical waste applications, and the like. As is well known in the art, such waste water streams contain significant levels of various ions of calcium, silicon, and other mineral carbonates. The presence of such materials results in scale build-up on hot reactor surfaces. Especially troublesome is the formation of anhydrite scale ($CaSO_4$) from the calcium and sulfate ions present. Due to the retrograde solubility of $CaSO_4$ (i.e., decreased aqueous solubility with increasing temperature), conditions within the reaction zone of a wet oxidation, down-hole reaction apparatus are especially favorable for the formation of anhydrite scale. Even minute quantities of calcium sulfate will precipitate out of solution and form hard anhydrite scale deposits on the hot (generally about 260° to 370° C.) reactor surfaces.

The build-up of inorganic scale on the reactor surfaces of a down-hole reactor system results in reduced flow rates of reactants through the system due to decreased heat exchange efficiencies. The lower flow rates generally result in lower through put or capacity and/or higher operational costs due to increased pumping costs and heat loss in the effluent. Heat exchange problems result in lower overall efficiencies, higher costs, and reduced control of the temperature and other operating parameters. With severe scale build-up the reaction does not get initiated any longer due to insufficient preheating of the influent.

Effective and efficient operation of a down-hole reactor requires that the scale which builds up on the reactor surfaces be periodically removed.

One method to remove the inorganic scale build-up is to simply flush the system with aqueous nitric acid or to circulate aqueous nitric acid through the reactor system. Generally, the pH of the aqueous nitric acid is in the range of about 1 to 5 and preferably in the range of about 1 to 3. Mineral deposits dissolved in the nitric acid solution and flakes of mineral loosened from the reactor surfaces are removed from the reactor system with the nitric acid solution. Descaling can also be carried out by using a combination of base and acid treatments as described in U.S. Pat. No. 4,692,252, which is hereby incorporated by reference. This combination method generally involves first treating the reactor surfaces with a base solution. Suitable base or alkali solutions include, for example, aqueous solutions of sodium hydroxide, potassium hydroxide, ammonium hydroxide, and the like with a pH of greater than about 8 and, preferably, greater than about 10. Preferably, the alkali solution used is a 10 volume percent aqueous solution of sodium hydroxide. The alkali solution converts the anhydrite deposits to calcium hydroxide. The alkali solution is also effective in removing complex silicate and aluminum compound deposits which may also be present. Following the alkali treatment, a nitric acid treatment is used to remove the calcium hydroxide formed. If desired, a water rinse can be used between the alkali and acid treatments to prevent neutralization of either treatment solution.

In such descaling processes, nitric acid tends to act as a solvent rather than as an acid/base reactant. Therefore, the nitric acid is not neutralized during the descaling procedure. After descaling, the nitric acid solution can be stored in a suitable tank for reuse in subsequent descaling operations. At some point, however, the nitric acid solution looses its ability to effectively remove scale deposit and is considered "spent." The prevailing practice is to neutralize the nitric acid contained in a used or spent descaling solution prior to disposal by reacting it with a base such as an oxide, hydroxide, or carbonate of sodium, calcium, or ammonia. When the combined alkali and acid treatment is used, the spent nitric acid solution can be neutralized with the alkali descaling solution if desired. The resulting neutralized effluents may still contain significant amounts of nitrogen-containing compounds. To discharge these materials, the nitrogen levels must be reduced considerably in order to meet existing local and federal water discharge standards. Such water standards are likely to become even more stringent in the future.

The present invention provides a method by which the nitric acid wash water streams from such descaling operations can be treated to significantly reduce the nitrogen content and the residual COD values of the waste stream. Such treatment preferably takes place in the same wet oxidation reactor system from which the nitric acid wash water was generated during descaling operations. For purposes of this invention, "nitric acid wash water" includes aqueous nitric acid solutions used for descaling wet oxidation reactor systems, especially down-hole reactor systems, which are used for treating organic wastes. The "nitric acid wash water" can be partially neutralized or unneutralized and it can be "spent" (i.e., no longer useful for descaling) or still have remaining descaling values. The nitric acid wash water may contain both dissolved scale material as well as loose, solid scale material removed from a down-hole reactor. This nitric acid wash water can be treated as is (i.e., containing both dissolved and loose, insoluble scale material). Or, if desired, the loose material can be removed by suitable settling or filtering techniques prior to being treated by the process of this invention. Removal of the loose, insoluble scale material prior to treatment may delay the onset of redeposition or new deposits of scale material on the reactor surfaces and may, therefore, be preferred in some instances. On the other hand, treatment of the loose, insoluble scale material along with the liquid portion may reduce the nitrogen content and COD values of the insoluble material and, therefore, simplify its ultimate disposal.

The metals contained in the scale may have a beneficial catalytic effect and increase COD-reduction and $N_2$ formation.

In the practice of this invention, as illustrated in FIG. 1, nitric acid wash water is mixed with organic wastes to be treated by the wet oxidation method. Generally, the method of forming the mixture of nitric acid wash water and organic wastes is not critical. Such a mixture can be formed directly in a storage tank. From the storage tank, the mixture of nitric acid wash water and organic wastes could be fed into a wet oxidation reactor, preferably a down-hole wet oxidation reactor system. Or the mixture could be formed directly in the wet oxidation reactor system. For example, the organic wastes could be fed as a first reactant stream into the downcomer of a down-hole reactor system and the nitric acid wash water could be fed as a second reactant stream into the downcomer of the reactor system such that the two waste streams mix directly in the downcomer. It is generally preferred that the two waste streams are mixed directly or inline prior to entering in the downcomer of the down-hole reactor system. This mixing in the downcomer can occur relatively near the surface of the ground or a considerable distance below the ground surface.

Generally, the amount of nitric acid wash water in the mixture to be co-processed will be in the range of 0.1 to 10 weight percent, and preferably in the range of 0.1 to 0.5 weight percent. The concentration of the nitric acid in the waste water is generally 1–20 weight percent. So long as there is sufficient organic waste present to initiate and maintain the autogenic oxidation reaction at the operating temperature and pressure of the reactor, the relative amounts of organic waste and nitric acid wash water are not critical. It is mostly dictated by the amount of waste acid which has to be disposed of and by the buffering capacity of the effluent, since low pH's of the influent and effluent should be avoided.

The mixture of organic wastes and nitric acid wash water is then reacted with an oxidant at an operating temperature of at least 150° C. and a pressure sufficient to keep the water in a liquid state at the operating temperature. Preferably the reaction will be carried out at 260° to 270° C. Suitable oxidants include air, oxygen-enriched air, pure gaseous oxygen or other oxygen donators. Generally, oxygen-enriched air and pure gaseous oxygen are preferred. Liquid oxygen can be supplied on site for conversion into the gaseous state for injection as needed. The amount of oxidant (not being nitric acid) required is, for economical reasons, that amount needed to initiate and maintain the autogeneous oxidation of the organic wastes, but non-autogeneous operation is also possible. Generally, that amount is at least in the range of about 30 to 90 weight percent of the COD value of the reaction mixture organic waste mixture. An economically preferable amount of oxidant for the high pressure wet oxidation is in the range of about 65 to 75 weight percent of the COD value of the reaction mixture.

The COD values of the nitric acid wash water and organic waste mixture can be determined by standard techniques. E.g., the COD values can be determined using Nederland standard method:

"Nederlandse Norm NEN 6633: Water—Determination of chemical oxygen demand (COD)." Other COD methods include, for example, those found in R. H. Dobbs and R. T. Williams, *Anal. Chem.* 35, 1064 (1963) and in "Standard Methods for the Examination of Water and Waste Water," Amer. Public Health Assoc., New York, N.Y., (1989). It is not generally necessary to determine the COD values on a routine basis as, in many instances, the wastes to be treated at a given facility will be relatively consistent and will, therefore, have relatively predictable COD values. In some instances, the COD values of the nitric acid wash water and organic waste mixture may be excessive (i.e., so high as to require higher levels of oxidant than normally used). In such cases, the oxidant level can simply be increased or, preferably, the COD values of the mixture decreased to the desired range by the addition of fresh or recycled dilution water.

The oxidant, preferably gaseous oxygen, can be added to the nitric acid wash water and organic waste mixture by injection of the oxidant into the waste mixture as it flows downwardly in a down-hole reactor. The oxidant, nitric acid wash water, and organic waste are then reacted at a temperature of at least 150° C., and a pressure sufficient to keep the water in the liquid state for a time sufficient to significantly reduce the COD values and the nitrogen content of the waste mixture. Preferably, the reaction temperature is in the range of about 210° to 370° C. and most preferably in the range of about 270° to 290° C. Preferably the oxidant, nitric acid wash water, and organic waste mixture are reacted in a down-hole reaction system such as described, for example, in U.S. Pat. Nos. 4,272,383, 4,744,908, 4,803,054 and 4,891,139, all of which are hereby incorporated by reference.

As one skilled in the art will realize, the undiluted and unneutralized nitric acid wash water can be corrosive and may, therefore, require extra precautions in handling and care in selection of the materials of construction. For example, acid-resistant materials (e.g. stainless steel) are preferably used where the undiluted nitric acid wash water comes in contact with the reaction tubes. If the nitric acid wash water is injected into the organic waste stream in close proximity to the organic waste stream inlet, either pumps suitable for low pH operation or fail-safe back-flow prevention mechanisms and pH control are preferred. In most cases, existing down-hole reactor systems currently used for treating organic wastes are fabricated from suitable materials of construction, feed pumps made from carbon steel, backflow mechanisms on the organic waste stream side of the reactor and a pH control loop are presently provided. Thus the amount of acid to be injected may be limited by the buffering capacity of the organic waste feed, which will normally suffice.

Figure 2:
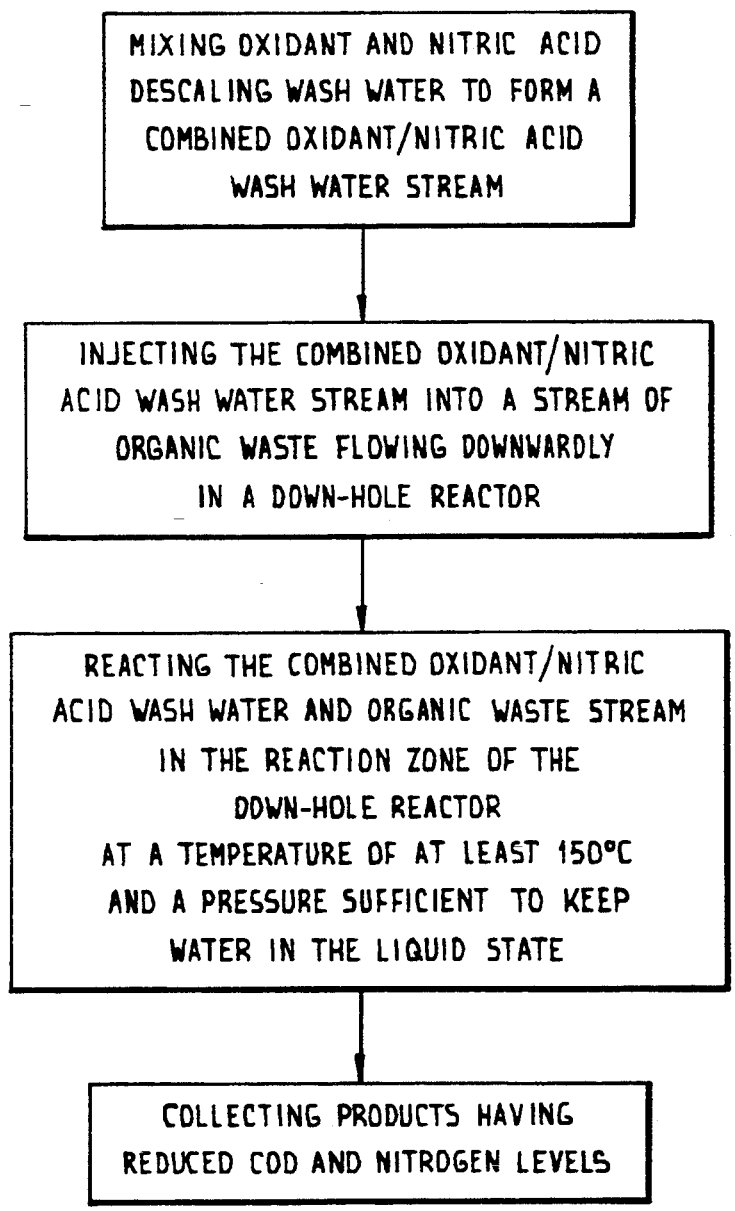
FIG. 2 is a flowchart illustrating a preferred method of the present invention for co-processing organic wastes and nitric acid descaling wash water in a wet oxidation reaction system.

The oxidant injection or feed pipes of down-hole reactor systems are generally constructed of acid-resistant materials and can, therefore, be used to great advantage for the addition of the nitric acid wash water stream to the organic sludge or waste to be treated. Such a preferred embodiment is illustrated in FIG. 2. In FIG. 2, the oxidant, preferably gaseous oxygen, and the nitric acid wash water (i.e. the resulting descaling solution) are mixed to form a combined oxidant/nitric acid wash water stream. Such a combined stream is preferably formed by injecting the nitric acid wash water into the oxidant injection line at the top of the reactor where the oxidant line goes below ground level. The amount of nitric acid wash water added to the oxidant stream can be adjusted so that the oxidant gas is saturated with water vapor throughout the length of the oxidant injection line. Especially where the oxidant reaches elevated temperatures prior to being injected into the organic waste stream (i.e. where the oxidant is added to the organic waste stream significantly below ground level), the presence of water vapor sufficient to saturate the oxidant gas will increase the safety of the process by eliminating or at least minimizing "dry spots" within the oxidant feed line, thus preventing deposit of metal salts which are present in the used acid. Eliminating or minimizing such "dry spots" by addition of wet acid increases the overall safety of the operation.

Again referring to FIG. 2, the combined oxidant/nitric acid wash water stream is injected into the organic waste stream flowing downwardly in a down-hole reactor. Preferably, the oxidant/nitric acid wash water stream is injected into the organic waste stream below ground level so that the oxidant/nitric acid wash water stream at the injection point is at an elevated temperature where a reaction can start. Most preferably, the oxidant/nitric acid wash water mixture is injected into the organic waste stream at least 300 meters below ground level where the temperature has already reached 150° C. Once the oxidant/nitric acid wash water mixture is injected into the organic waste stream, the wet oxidation reaction is allowed to proceed at a temperature of at least 150° C. and a pressure sufficient to keep the water in a liquid state in the reaction zone for a time sufficient to significantly reduce the COD values and nitrogen content of the waste materials. The actual wet oxidation reaction and the reaction conditions are the same as those considered above in the discussions of the general process illustrated in FIG. 1.

Figure 3:
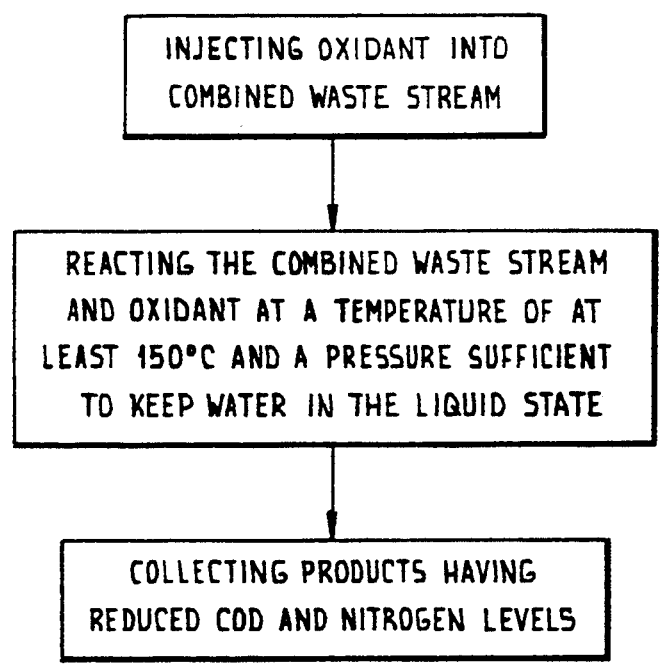
FIG. 3 is a flow chart illustrating the general method of the present invention for reducing nitrogen content of waste products under aqueous phase oxidation conditions.

Both the general process illustrated in FIG. 1 and the preferred process illustrated in FIG. 2 yield reaction products having significantly reduced COD values and nitrogen content. The process illustrated in FIG. 3 yields significant reduction in nitrogen content. Obviously the COD-reduction is a result of the oxygen which is added to the process. If the nitrogen content and COD values (and any other regulated parameters) are sufficiently low, the product stream can be discharged to waterways or waste water treatment plants in accordance with existing regulations. The resulting waste water stream can also be used to dilute additional organic wastes to be treated by the wet oxidation system. In some cases, however, the COD values or nitrogen content of the resulting waste water stream may not be sufficiently reduced to allow direct discharge. In such cases, the waste water stream may be further treated. Such further treatment processes include, for example, biological polishing, aerobic polishing, evaporation/condensation processes, ultrafiltration, reverse osmosis, and the like. Even if further treatment is required when the process of this invention is used, the size of the nitrification and denitrification system or other purification system will be significantly reduced.

As noted above, both the COD and nitrogen content of mixtures of organic or biological wastes and nitric acid wash water, when treated by the process of this invention, are significantly reduced. Generally, the COD of a reaction mixture treated by the aqueous phase oxidation process is reduced by at least 50 weight percent and preferably by at least 70 weight percent. These ranges of COD reduction are similar to those generally observed with similar organic or biological wastes if they are treated under similar wet oxidation conditions without added nitric acid wash water. Generally, the nitrogen content (as expressed by total kjeldahl nitrogen (TKN)) is reduced by 10 to 40 weight percent or more. The nitrate content is generally reduced by about 20 to 50 weight percent and the additional COD reduction is 2 to 20%. Under process conditions shown in FIG. 3 the TKN content of organic or biological wastes treated under wet oxidation conditions without added nitric acid wash water is generally reduced by 10 to 20 weight percent. Thus, the process of this invention allows for very significant and surprising reduction of the nitrogen and COD content of the organic or biological wastes treated with added nitric acid wash water as compared to similar wastes treated without added nitric acid wash water.

Although not wishing to be limited by theory, it appears that at least a significant portion of the reduction of the nitrogen content occurs by conversion of the nitrogen in the nitrogen-containing compounds—both organic and inorganic—in the organic wastes and nitric acid wash water into nitrogen gas ($N_2$) which can be vented into the atmosphere. The following examples are intended to illustrate, but not to limit, the invention.

EXAMPLE 1

Various samples of municipal waste sludge from Veluwe, The Netherlands, were treated under wet oxidation conditions in a pressurized laboratory autoclave. Typical nitric acid wash water has a pH of 1–2. The combined waste sludge and nitric acid wash water mixture had a total COD value of about 18,900 mg/l and a TKN level of 1365 mg/l. This mixture was then treated under wet oxidation conditions with varying oxygen levels. In each case, the reactants were placed in the laboratory autoclave. The autoclave was heated to 277° C. The total time at a temperature of 150° C. or higher was about one-half hour. Once the reactants had cooled to room temperature, the reaction products were analyzed for COD and nitrogen content. The results are presented in the following Table. In this Table, the oxygen content is reported as that amount necessary to provide a given percentage of the COD value.

TABLE 1

|  | Original Mixture | 50% $O_2$ | 80% $O_2$ | 3 × 50% $O_2$ |
|---|---|---|---|---|
| Sample No. | 020385 | 020387 | 020388 | 020389 |
| COD (mg/l) | 18,900 | 5,750 | 4,440 | 3,650 |
| Reduction |  | 69.6% | 76.5% | 80.7% |
| TKN (mg/l) | 1,365 | 1,135 | 968 | 896 |
| Reduction |  | 16.8% | 29.1% | 34.4% |
| Nitrate (mg/l) | 2,660 | 2,060 | 1,840 | 1,740 |
| Reduction |  | 22.6% | 30.8% | 34.6% |
| Nitrite (mg/l) | 0.05 | 0.05 | 0.15 | 0.05 |
| Ammonia | 780 | 970 | 840 | 830 |

For comparison purposes, a similar waste sludge from Veluwe was treated in 14 separate tests under similar conditions but without any added nitric acid. This comparison sludge contained 38,227 mg/l COD and 2,739 mg/l TKN. After treatment with 100% oxygen at 530° F. under similar conditions, the COD was reduced to 10,030 mg/l (73.8% reduction) and the TKN was >2570 mg/l (<6% reduction). The presence of the nitric acid wash water may result in an additional reduction in the nitrogen content (expressed as TKN) as compared to similar waste materials without added nitric acid wash water. Table 4 gives the results. The table shows that the reduction in TKN increases with temperature and residence time.

TABLE 4

| PEAK TEMP (°C.) | Veluwe Sludge LBR Test Program | | | |
|---|---|---|---|---|
| | TIME AT PEAK TEMPERATURE (Min) | | | |
| | Short | 5 | 10 | 60 |
| 180 | | | | |
| 200 | | | | |
| 232 | | | TKN 2740 No Reduction | TKN 2810 No Reduction |
| 260 | | | TKN 2630 4% Reduction | TKN 2560 7% Reduction |
| 268 | | TKN 2550 7% Reduction | TKN 2310 16% Reduction | TKN 2460 10% Reduction |
| 277 | | TKN 2570 6% Reduction | TKN 2490 9% Reduction | TKN 2410 12% Reduction |
| 288 | TKN 2560 7% Reduction | TKN 2452 10% Reduction | TKN 2491 9% Reduction | TKN 2357 14% Reduction |

Effluent Analysis: TKN (mg/l) TKN-2739 mg/l

EXAMPLE 2

A similar acid nitric wash water and waste sludge mixture from Veluwe as used in Example 1 was treated in a laboratory autoclave with 80% oxygen at 290° C. The reaction mixture was held at 290° C. for one hour. The results are presented in the following Table.

|  | Original Mixture | Reaction Products |
|---|---|---|
| Sample No. | 020363 | 020374 |
| COD (mg/l) | 32,600 | 5,790 |
| Reduction |  | 82.2% |
| TKN (mg/l) | 2,520 | 2,110 |
| Reduction |  | 16.3% |
| Nitrate (mg/l) | 770 | 535 |
| Reduction |  | 30.0% |
| Nitrite (mg/l) | 12.5 | 0.05 |
| Ammonia (mg/l) | 960 | 1,770 |

EXAMPLE 3

The same nitric acid and organic waste mixture as used in Example 2 was treated with 65% oxygen at 260° C. in a laboratory autoclave. The temperature was held at 260° C. for 30 minutes. The following results were obtained:

|  | Original Mixture | Reaction Products |
|---|---|---|
| Sample No. | 020363 | 020375 |
| COD (mg/l) | 32,600 | 8,250 |
| Reduction |  | 74.7% |
| TKN (mg/l) | 2,520 | 2,170 |
| Reduction |  | 13.9% |
| Nitrate (mg/l) | 770 | 505 |
| Reduction |  | 34.4% |
| Nitrite (mg/l) | 12.5 | 0.1 |
| Ammonia (mg/l) | 960 | 1,740 |

COMPARISON EXAMPLE

For comparison purposes, a waste sludge from Veluwe, which is similar to the sludge material used in Examples 1–5, was treated under wet oxidation conditions but without any added nitric acid. This comparison sludge contained 38,227 mg/l COD and 2,739 mg/l TKN. The sludge was treated with 100% oxygen at 535° F. The time at the maximum temperature was varied between 5 and 60 minutes. The following results were obtained.

|  | Original Mixture | Reaction Time (minutes) | | |
| --- | --- | --- | --- | --- |
|  |  | 5 | 10 | 60 |
| COD (mg/l) | 38,227 | 8,680 | 8,220 | 5,840 |
| Reduction |  | 77.3% | 78.5% | 84.7% |
| TKN (mg/l) | 2,739 | 2,570 | 2,490 | 2,410 |
| Reduction |  | 6% | 9% | 12% |

A comparison of this data with that presented in Examples 1–5 shows
  TKN reduction increases with temperature and residence time and occurs under the oxidation conditions of 260° C. or more.
  TKN and reduction in nitrate occur in significant proportions above the 260° C. chosen.
  Increased COD reductions occur in example 2 to 10%. The lower the oxygen supply is kept, the larger is the effect.
  Run 020387 shows about 20% additional oxygen reduction.

We claim:

1. A method for co-processing organic wastes and nitric acid wash water in a wet oxidation reaction apparatus, whereby the chemical oxygen demand and the nitrogen content of the organic waste and the nitric acid wash water are substantially reduced, the method comprising the steps of:
  (a) mixing the organic wastes and nitric acid wash water to form a combined water stream;
  (b) injecting an oxidant into the combined waste stream;
  (c) reacting the combined waste stream and oxidant in a wet oxidation reaction apparatus at a temperature greater than 150° C. and a pressure sufficient to keep the water in the liquid state for a time sufficient to form reaction products with at least a 50 weight percent reduction in the chemical oxygen demand and at least 10 weight percent reduction in the nitrogen content, as expressed in total kjeldahl nitrogen relative to the original organic waste and nitric acid wash water; and
  (d) collecting the reaction products;
wherein the nitric acid wash water is derived from descaling of a wet oxidation reaction system used for the treatment of organic wastes by circulation of an aqueous nitric acid solution through the wet oxidation reaction system to dissolve accumulated scale therein.

2. A method for co-processing organic wastes and nitric acid wash water in a wet oxidation, down-hole reaction apparatus, whereby the chemical oxygen demand and the nitrogen content of the organic waste and the nitric acid wash water are substantially reduced, the method comprising the steps of:
  (a) flowing the organic waste downwardly into the down-hole reaction apparatus as a stream of influent waste;
  (b) injecting the nitric acid wash water into a gaseous oxidant stream to form a combined oxidant and nitric acid wash water stream;
  (c) injecting the combined oxidant and nitric acid wash water stream into the stream of influent waste flowing downwardly in the down-hole reaction apparatus;
  (d) reacting the stream of influent waste with the combined oxidant and nitric acid wash water stream by the wet oxidation reaction in the down-hole reaction apparatus at a temperature greater than 150° C. and a pressure sufficient to keep the water present in the liquid state to form reaction products with at least 50 weight percent reduction in the chemical oxidation demand and at least 10 weight percent reduction in the nitrogen content, as expressed in total kjeldahl nitrogen relative to the original organic waste and nitric acid wash water; and
  (e) collecting the reaction products;
wherein the nitric acid wash water is derived from descaling of the down-hole reaction apparatus by circulation of an aqueous nitric acid solution through the down-hole reaction apparatus to dissolve accumulated scale therein.

3. A method as defined in claim 1, wherein the wet oxidation reaction apparatus is a wet oxidation, down-hole reaction apparatus, wherein the organic wastes and nitric acid wash water are mixed by flowing the organic wastes downwardly into the down-hole reaction apparatus as a first stream of influent waste and flowing the nitric acid wash water downwardly into the down-hole reaction apparatus as a second stream of influent waste such that the first and second streams of influent waste are combined to form a single stream of influent waste flowing downwardly in the down-hole reaction apparatus, and wherein the oxidant is injected into the single, combined stream of influent wastes flowing downwardly in the down-hole reaction apparatus.

4. A method as defined in claim 1, wherein the wet oxidation reaction apparatus is a wet oxidation, down-hole reaction apparatus, wherein the organic wastes and nitric acid wash water are first mixed and then the mixture of organic wastes and nitric acid wash water is injected into the down-hole reaction apparatus such that the mixture flows downwardly into the down-hole reaction apparatus, and wherein the oxidant is injected into the mixture flowing downwardly in the down-hole reaction apparatus.

5. A method as defined in claim 1, wherein the nitric acid wash water is derived from descaling of a wet oxidation, down-hole reaction system used for the treatment of organic wastes by circulation of an aqueous nitric acid solution through the wet oxidation reaction system to dissolve accumulated scale therein.

6. A method as defined in claim 1, wherein the oxidant is gaseous oxygen and the amount of oxidant used is in the range of about 30 to 90 weight percent of the chemical oxygen demand value of the combined waste stream.

7. A method as defined in claim 6, wherein the combined waste stream and oxidant are reacted at a temperature of about 210° to 370° C.

8. A method as defined in claim 1, wherein the collected products have at least a 70 weight percent reduction in the chemical oxygen demand and at least a 15 weight percent reduction in the nitrogen content, as expressed in total kjeldahl nitrogen, relative to the original organic waste and nitric acid wash water.

9. A method as defined in claim 2, wherein the oxidant is gaseous oxygen and the amount of oxidant used is in the range of about 30 to 90 weight percent of the chemical oxygen demand value of the original organic waste and nitric acid wash water.

10. A method as defined in claim 9, wherein the stream of influent waste water and the combined oxidant and nitric acid wash water are reacted at a temperature of about 210° to 370° C.

11. A method as defined in claim 2, wherein the collected products have at least a 70 weight percent reduction in the chemical oxygen demand and at least a 15 weight percent reduction in the nitrogen content, as expressed in total kjeldahl nitrogen, relative to the original organic waste and nitric acid wash water.

* * * * *